UNITED STATES PATENT OFFICE.

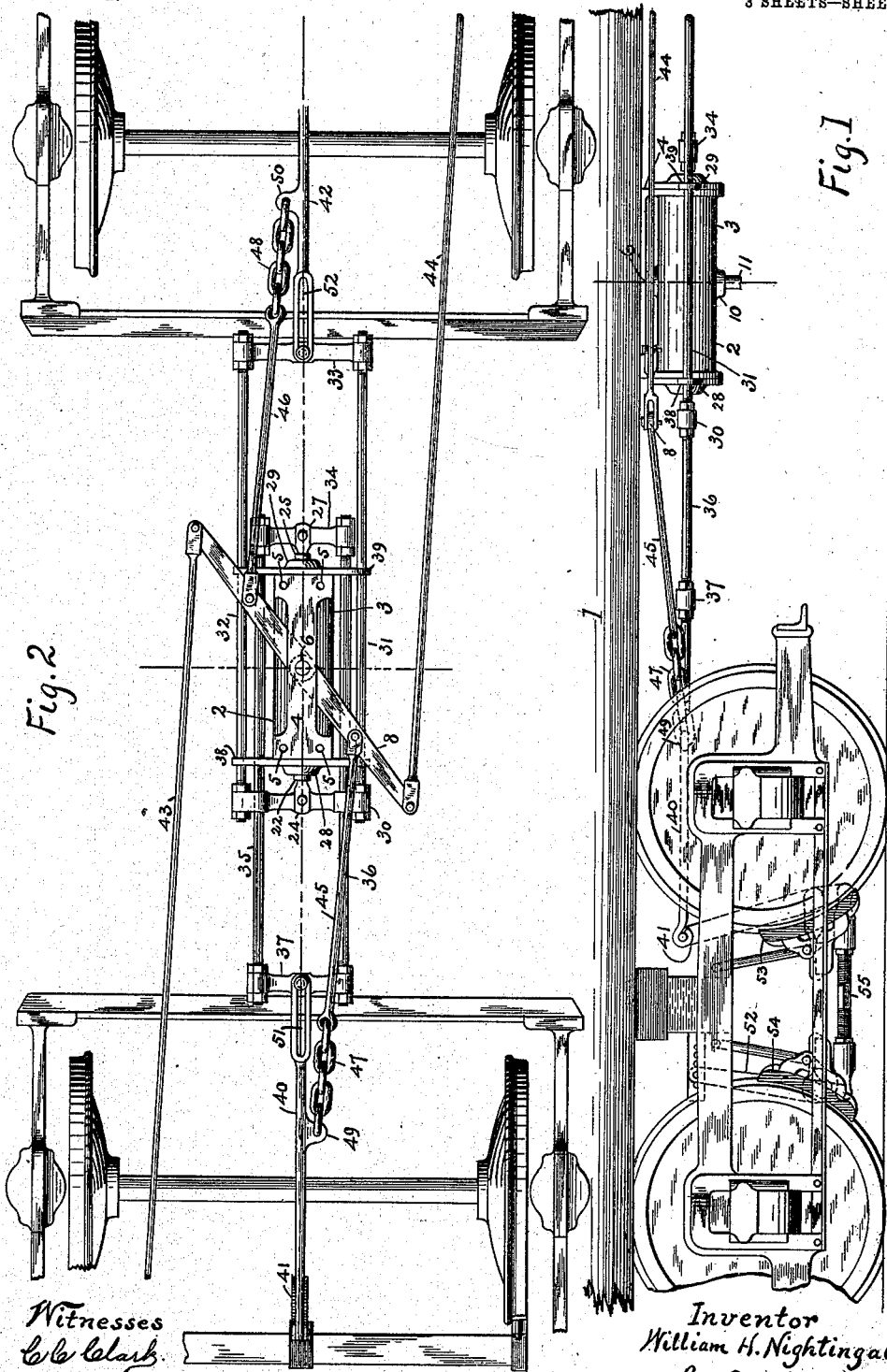

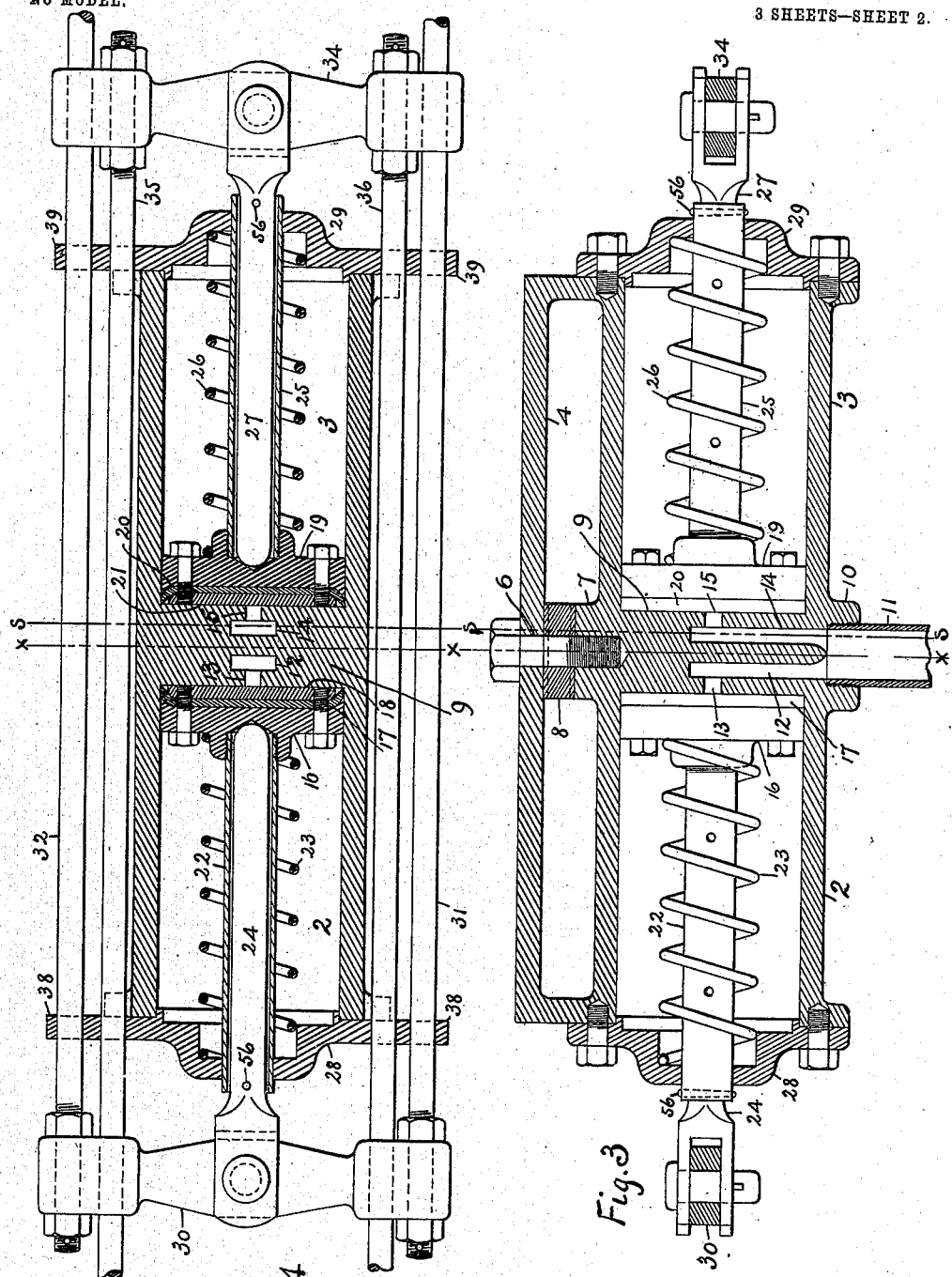

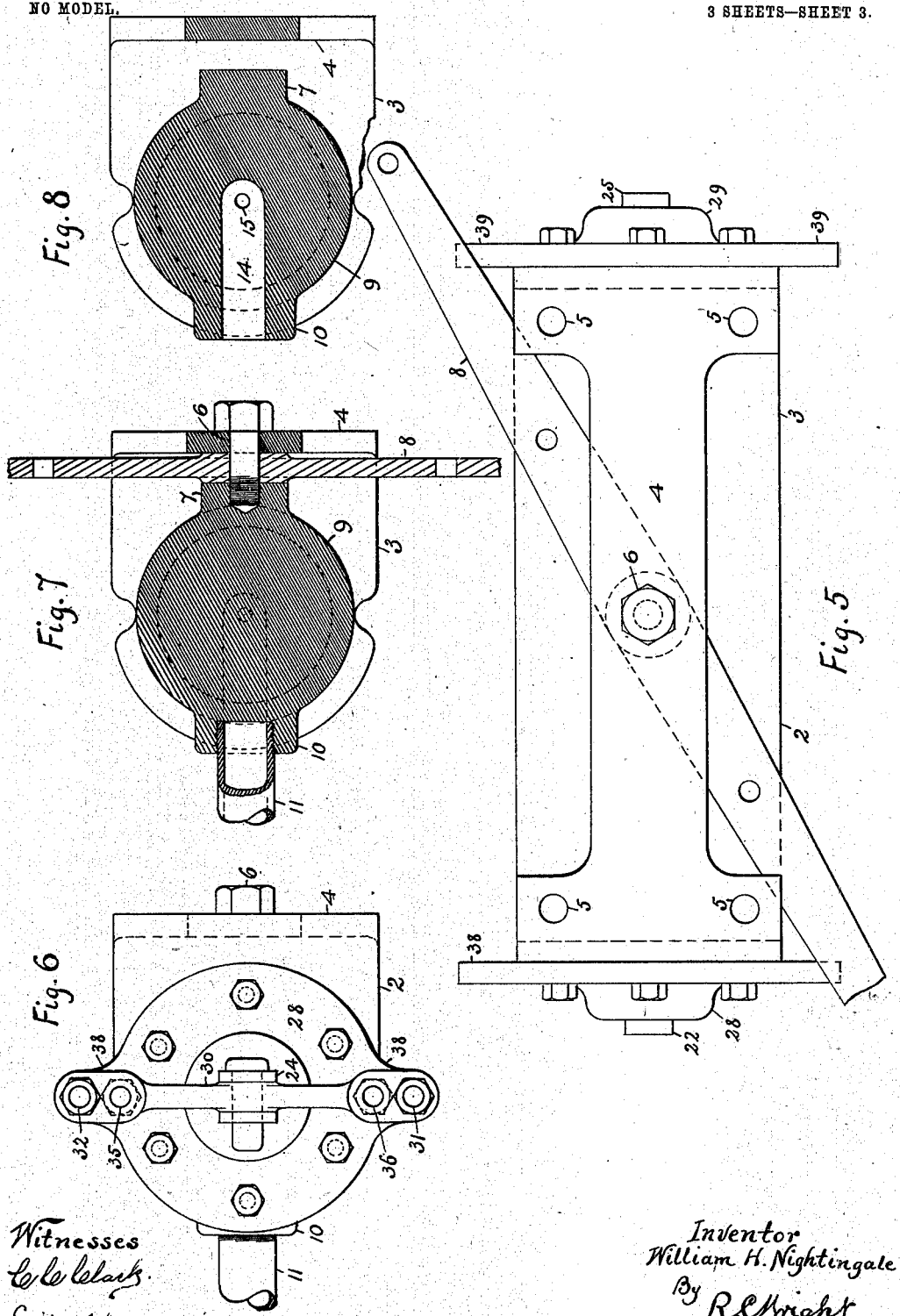

WILLIAM H. NIGHTINGALE, OF PHILADELPHIA, PENNSYLVANIA, ASSIGNOR TO JOHN E. REYBURN, OF PHILADELPHIA, PENNSYLVANIA.

DUPLEX AIR-BRAKE SYSTEM.

SPECIFICATION forming part of Letters Patent No. 723,297, dated March 24, 1903.

Application filed May 20, 1902. Serial No. 108,157. (No model.)

*To all whom it may concern:*

Be it known that I, WILLIAM H. NIGHTINGALE, a citizen of the United States, residing at Philadelphia, in the county of Philadelphia and State of Pennsylvania, have invented certain new and useful Improvements in Duplex Air-Brake Systems, of which the following is a specification.

The object of my invention is to provide a duplex-cylinder construction for air-brakes with independent attachments from each cylinder and its piston to each truck, and whereby the brake-shoes of each truck shall be moved to their wheels independently of the other truck, so that the amount of slack or distance of the brake-shoes from the wheels shall be taken up independently to enable a quick action of the brake on each truck without any loss of time in forcing the shoes to one set of wheels in order to form a backstop, which it is necessary to do in order to permit the other set of shoes to move up to and act upon their wheels or a quick movement of all shoes to their wheels independent of the distance of the shoes from the wheels of the respective trucks. By my mechanism the brake-cylinders are placed at the longitudinal and transverse centers of the car-bottom, and the hand-brake lever is fulcrumed at the center of the car with equal leverage from each end of the car and so constructed that the hand mechanism and power mechanism, while connected, do not when used move any part of the other mechanism, which is a saving in power, wear and tear, and time in taking up lost motion in numerous connections, besides dispensing with many parts heretofore necessary where a single brake-cylinder was employed, set to one side of the car and operated by means of numerous levers and connections, having much lost motion on account of loose pin-fastenings and creating friction by rubbing on numerous supports, all of which is reduced to a minimum by my construction, and other novel features which will be further set forth.

My invention is illustrated in the accompanying drawings, in which—

Figure 1 is an elevation of one truck of a car, showing its relative location as to the brake-cylinders. Fig. 2 is a plan showing the duplex brake-cylinders, one truck, and the power connections and hand-brake connections to the trucks. Fig. 3 is a vertical central section of the duplex cylinders. Fig. 4 is a horizontal section of the duplex cylinders, the pistons, the inner cross-heads, and their connections to the pistons. Fig. 5 is a top view of the duplex cylinders and the hand-brake lever. Fig. 6 is an end view of the cylinders and a cross-head. Fig. 7 is a cross-section through the cylinder's partition and the hand-brake lever on line $x$ $x$, Figs. 3 and 4. Fig. 8 is a cross-section through one of the ports of the cylinder's partition on line $s$ $s$, Figs. 3 and 4.

Similar reference-figures indicate similar parts throughout the views.

The body 1 of the car may be of any suitable form. Supported upon trucks near its ends and underneath the body 1 between the trucks at its longitudinal and transverse centers are suspended the duplex cylinders 2 3. The cylinders have formed at their upper part a plate 4, with holes 5, through which holding-bolts are introduced to secure the cylinders to body 1, and at the center a bolt 6 is screwed into a boss 7, the bolt forming a fulcrum for the hand-brake lever 8. Cylinders 2 3 are separated at their inner ends by a partition 9. At the lower side of the partition is a boss 10, into which is screwed pipe 11, which delivers pressure to the cylinders, and in communication with the pipe are ports 12 13, leading into cylinder 2, and ports 14 15, leading into cylinder 3, so that when air-pressure passes into pipe 11 it passes independently to each cylinder, enabling the lost motion of the parts connected to each cylinder and each truck to act independently in forcing the brake-shoes until such time as all lost motion has been overcome and all shoes are up to their wheels on each truck, at which time the pressure will be equalized and all the brake-shoes will be forced to the wheels with equal effect. Within cylinder 2 is a piston 16, having a soft packing 17, (preferably leather,) secured by a follower 18, and cylinder 3 is similarly equipped with piston 19, packing 20, and follower 21. Piston 16 has a guide-pipe 22 screwed thereto, which passes through the outer head of the cylinder, over which is a return-spring 23, and within the pipe is a piston-rod 24. The cylinder 3 is similarly equipped with a guide-pipe 25, spring 26, and rod 27. These parts are not new, being when singly used common to present systems of brakes. Cylinder 2 has a removable head 28, and cylinder 3 has a removable head 29. In all respects the cylinders are duplicates, and likewise are their pistons and the parts already described. Piston-rod 24 of cylinder 2 is attached to a cross-head 30. At the ends of the cross-head are attached pull-rods 31 32, which pass back by the sides of cylinders 2 3 to a point beyond cylinder 3, where the rods are secured to another cross-head 33. Piston-rod 27 of cylinder 3 is attached to a cross-head 34, which has pull-rods 35 36 attached to its ends, the rods thereafter passing forward at the sides of cylinders 2 3 and at a point beyond cylinder 2, where they are secured to a cross-head 37. Rods 31 32 35 36 are guided through lugs 38 on cylinder-head 28 and through lugs 39 on cylinder-head 29, and the rods 35 36 are also guided through cross-head 30. To cross-head 37 is attached a rod 40, which is also attached to a truck's live-brake lever 41, (see Figs. 1, 2,) and cross-head 33 has a similar rod 42, which is attached to the live-brake lever of the other truck. (Not shown.) Thus it will be seen that whatever pressure is exerted against the pistons is directly and fully utilized to force the brake-shoes to the wheels with equal pressure on all shoes and with quick action, this system being much quicker and more effective and economical than the constructions where a single cylinder is used, as in that case the cylinder is placed toward one side of the car, and a system of decreased-power levers must be employed to transmit the power. When levers are used, many pin connections must be used, and as each has some freedom or lost motion which must be overcome before the brake acts the tendency is to slow action, and power is lost in overcoming the riding of numerous levers on their supports or carriers and the friction of the numerous joints. By my direct-acting system there is also a saving in the amount of power necessary to apply the brakes, as the full cylinder-power is effective, whereas when the former lever system was used the cylinder-pressure actuated upon the short end of the lever, and in consequence more pressure must be used to obtain the same results than when the action is direct. This requires more expenditure of energy to produce the additional volume of pressure required. Hand-brake lever 8 is fulcrumed upon the brake-cylinders at their top. It has rods 43 44 attached to its ends and running therefrom to each end of the car, where they are to be connected to suitable means for their movement by hand-power. Intermediate to the central fulcrum and rods 43 44 are attached rods 45 46, which are provided at their outer ends with chains 47 48 or other flexible connections attached to lugs 49 50, formed on rods 40 42, these rods also being provided with slots 51 52 where they connect to cross-heads 33 37.

The parts just described permit the use of the hand-brake or the power-brake independently, and when so used the hand-brake does not move any part of the power-brake or the power-brake does not move any part of the hand-brake. In previous constructions whenever the hand-brake is used all parts of the power-brake except the piston are moved. This lessens the power of the hand-brake on account of excessive friction, the weight of the moving parts, and makes the brake slow on account of excessive lost motions to be taken up, all of which is overcome by my mechanism. The truck live-lever 41, dead-lever 52, brake-shoes 53 54, and turnbuckle 55 may be used or any other truck-brake arrangement suitable to coact with my mechanism. In some instances it is desirable to secure rods 24 27 to their pistons, and at such times pins 56 are inserted, as seen in Figs. 3, 4.

I claim—

1. In a brake, duplex cylinders having a central partition and placed end to end, centrally under the body of a vehicle, a piston for each cylinder, trucks supporting the vehicle, wheels and brake-shoes for the trucks, means located on the trucks to operate the shoes, and direct connections from each cylinder and its piston to the brake mechanism of the truck farthest removed from said cylinder.

2. In a brake system, duplex cylinders centrally located upon a vehicle and between its trucks, pistons in the cylinders, means to introduce air-pressure between the cylinders and separately to each cylinder, a rod from each piston and direct connections therefrom to brake mechanism located and operative upon the truck most remote from said cylinder and its piston.

3. In a brake system, centrally-located duplex cylinders placed end to end, a partition between the cylinders, ports in the partition leading to each cylinder, a pressure-pipe connected in common to the ports, a piston in each cylinder, a guide-pipe for each piston, a piston-rod for each piston, an inner cross-head for each piston-rod and located near the outer end of each cylinder, an outer cross-head beyond each of the aforesaid cross-heads, means to connect the inner cross-head of each cylinder with the outer cross-head beyond the other cylinder, and connections from each outer cross-head to the live-brake lever of a truck.

4. In a brake system, a car, two brake-cylinders placed in central alinement under the car, air connections and ports between the cylinders, pistons in the cylinders and adapted to be forced outwardly in opposite directions, trucks under and supporting the car, brakes on the trucks, and direct connections from each cylinder's piston to the brake mechanism of the opposite truck.

5. In a brake, duplex cylinders placed in alinement, end to end, a partition separating the cylinders, pistons in the cylinders, means to introduce pressure between the cylinders and their pistons in manner to force the pistons in opposite directions, a cross-head near each cylinder's end and means for its outward movement by the piston, a rod connected to each end of the said cross-heads and thereafter passing by each side of the cylinders and beyond the end of the opposite cylinder, a second cross-head to each end of which the rods from each of the aforesaid cross-heads are attached and located beyond the first-named cross-heads, a pair of trucks and brakes thereon, and direct connections from the second-named cross-heads to a truck-brake.

6. In a car-brake, the combination of a car having supporting-trucks and brakes on the trucks of duplex brake-cylinders integrally formed and having a central partition attached under the car at its longitudinal and transverse centers, a single air connection with separate ports for each cylinder, pistons within the cylinders and adapted to be powermoved in opposite directions, and direct connections from the cylinder at each side of the longitudinal center of the car-body to the truck-brake mechanism at the opposite side of the longitudinal center of the car-body.

7. In a brake, an integral cylinder-body having a central cross-partition whereby two cylinders are formed in the body, ports and air-passages in the central partition in communication with the inner end of each cylinder, a piston in each cylinder adapted for outward movement by pressure, means to automatically return the pistons to the inner ends of the cylinders when the pressure is removed, connections for each piston whereby its power is exerted beyond the opposite cylinder in direction toward the opposite cylinder, a car whereon the cylinder-body is located, trucks with brake appliances supporting said car, and connections from each truck to the adjacent piston connection.

8. In a brake system, a car, two brake-cylinders placed in central alinement under the car, air connections and ports between the cylinders, pistons in the cylinders, guide-pipes for the pistons, return-springs for the pistons, piston-rods seated on the pistons but not attached thereto, means to secure the piston-rods to the guide-pipes and thereby insure their movement in both directions with the pistons, trucks under and supporting the car, brakes on the trucks, and direct leverless connections from each cylinder-piston to the brake mechanism of the opposite truck.

9. In a brake system, a car, trucks for the car at each end, brake-shoes and means for their operation located on the trucks, duplex brake-cylinders affixed under the car at its center, pistons in the cylinders and connections therefrom to the brake mechanisms of oppositely-disposed trucks, air connections for supplying pressure to the brake-cylinders, a hand-brake lever fulcrumed upon the cylinders, connections therefrom to hand-operated mechanisms at each end of the car, and to the connections from the brake-cylinders to the truck-brake mechanisms, and constructed and attached in manner to permit the hand-brake to be operated without moving any parts of the power-brake mechanism, and vice versa.

In testimony whereof I affix my signature in presence of two witnesses.

WILLIAM H. NIGHTINGALE.

Witnesses:
  WILLIAM C. STOEVER,
  R. C. WRIGHT.